(12) United States Patent
Wolff et al.

(10) Patent No.: US 7,680,757 B2
(45) Date of Patent: Mar. 16, 2010

(54) ASSOCIATION RULE MINING IN PEER-TO PEER SYSTEMS

(75) Inventors: Ran Wolff, Geva-Carmel (IL); Assaf Schuster, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 0 days.

(21) Appl. No.: 11/577,345

(22) PCT Filed: Nov. 9, 2005

(86) PCT No.: PCT/IL2005/001172
§ 371 (c)(1),
(2), (4) Date: Jun. 21, 2007

(87) PCT Pub. No.: WO2006/051530
PCT Pub. Date: May 18, 2006

(65) Prior Publication Data
US 2008/0086441 A1   Apr. 10, 2008

Related U.S. Application Data

(60) Provisional application No. 60/626,473, filed on Nov. 10, 2004.

(51) Int. Cl.
G06F 17/00 (2006.01)
G06N 7/00 (2006.01)
G06N 7/08 (2006.01)

(52) U.S. Cl. .................................................. 706/59

(58) Field of Classification Search .......... None
See application file for complete search history.

(56) References Cited

U.S. PATENT DOCUMENTS

| 6,094,645 A | 7/2000 | Aggarwal et al. | |
|---|---|---|---|
| 2002/0198877 A1* | 12/2002 | Wolff et al. | 707/6 |
| 2004/0218602 A1* | 11/2004 | Hrastar | 370/390 |

OTHER PUBLICATIONS

'A fast distributed algorithm for mining association rules': Cheung, 1996, IEEE, 0-8186-7475-X pp. 31-42.*
'Privacy preserving association rule mining': Saygin, 2002, IEEE, 1066-1395/02.*
U.S. Appl. No. 60/626,473, filed Nov. 10, 2004.
Agrawal et al., "Mining Association Rules between Sets of Items in Large Databases," *Proceedings of the 1994 ACM SIGMOD International Conference on Management Data*, Washington, DC, Jun. 1993, 207-216.
Agrawal and Srikant, "Fast Algorithms for Mining Association Rules," *Proceedings of the 20th International Conference on Very Large Databases (VLDB94)*, Santiago, Chile, 1994, 487-499.

(Continued)

*Primary Examiner*—David R Vincent
*Assistant Examiner*—Peter Coughlan
(74) *Attorney, Agent, or Firm*—Darby & Darby P.C.

(57) ABSTRACT

A method for discovering association rules in a distributed database that includes a plurality of partitions associated with respective computing nodes includes generating a candidate association rule defining an association relationship between itemsets in the distributed database. At each node among at least a subset of the nodes, an asynchronous fully-distributed majority voting process is applied to assess a correctness of the candidate association rule.

39 Claims, 6 Drawing Sheets

OTHER PUBLICATIONS

Agrawal and Shafer, "Parallel Mining of Association Rules," *IEEE Trans. on Knowledge and Data Engineering* (8:6), 1996, 962-969.

Cheung et al., "A Fast Ditributed Algorithm for Mining Association Rules," *Proc. of the 1996 International Conf. on Parallel and Distributed Information Systems*, Miami Beach, Florida, 1996, 31-44.

Schuster and Wolff, "Communication-Efficient Distributed Mining of Association Rules," *Proc. of the 2001 ACM SIGMOD International Conf. on Management of Data*, Santa Barbara, CA, May 2001, 473-484.

* cited by examiner

ASSOCIATION RULE MINING IN PEER-TO PEER SYSTEMS

CROSS-REFERENCE TO RELATED APPLICATION

The present patent application is a 371 U.S. National Phase of PCT Application No. PCT/IL2005/001172, filed Nov. 9, 2005, which claims priority of U.S. Provisional Patent Application 60/626,473, filed Nov. 10, 2004. Both of the aforementioned applications are hereby incorporated herein by reference in their entireties.

FIELD OF THE INVENTION

The present invention relates generally to database rule mining, and particularly to methods and systems for discovering association rules in large-scale distributed computer systems.

BACKGROUND OF THE INVENTION

Association Rule Mining (ARM) in large transactional databases is a central problem in the field of knowledge discovery. ARM is described, for example, by Agrawal et al., in "Mining Association Rules Between Sets of Items in Large Databases," Proceedings of the 1993 ACM SIGMOD International Conference on Management of Data, Washington, D.C., June 1993, pages 207-216, which is incorporated herein by reference.

A variety of algorithms have been developed for ARM. Such algorithms are described, for example, by Agrawal and Srikant in "Fast Algorithms for Mining Association Rules," Proceedings of the 20th International Conference on Very Large Databases (VLDB94), Santiago, Chile, 1994, pages 487-499, which is incorporated herein by reference.

In Distributed Association Rule Mining (D-ARM), the ARM problem is restated in the context of distributed computing. Several D-ARM methods are known in the art. An exemplary D-ARM algorithm is described by Agrawal and Shafer in "Parallel Mining of Association Rules," IEEE Transactions on Knowledge and Data Engineering (8:6), 1996, pages 962-969, which is incorporated herein by reference.

An algorithm that aims to reduce the communication load associated with D-ARM is described by Cheung et al. in "A Fast Distributed Algorithm for Mining Association Rules," Proceedings of the 1996 International Conference on Parallel and Distributed Information Systems, Miami Beach, Fla., 1996, pages 31-44, which is incorporated herein by reference.

Schuster and Wolff describe yet another algorithm that reduces the communication overhead of the D-ARM process in "Communication-Efficient Distributed Mining of Association Rules," Proceedings of the 2001 ACM SIGMOD International Conference on Management of Data, Santa Barbara, Calif., May 2001, pages 473-484, which is incorporated herein by reference.

SUMMARY OF THE INVENTION

In some ARM applications, the database in which association rules are to be discovered is partitioned among a large number of computing nodes, each comprising a local database. Such applications are referred to as large-scale distributed association rule mining (LSD-ARM) applications. In some cases, the distributed database is dynamic, with nodes and communication links between them added and removed and with transactions added and deleted over time.

Embodiments of the present invention provide methods and systems that are particularly well-suited for discovering association rules in such large-scale, dynamically-changing distributed databases. In some embodiments, each node generates candidate association rules and applies a distributed majority voting process in order to assess the correctness of these candidates. In some embodiments, two instances of the majority voting process are invoked, for measuring the frequency and the confidence of the rule being evaluated.

Each node performs the LSD-ARM process separately and asynchronously of other nodes. The nodes coordinate their assumptions regarding the global majority voting result by exchanging update messages with one another. The LSD-ARM process is an "anytime" process, in which each node constantly maintains a local ad-hoc solution comprising a list of association rules assumed to be correct. Under stable conditions, the ad-hoc solution is shown to rapidly converge to the global solution.

Unlike some known methods, the ARM methods described herein are fully-distributed, as they do not use any centralized synchronization or broadcast mechanisms. The disclosed methods are local, in the sense that each node typically communicates with only a small fraction of the total nodes (in other words, each node scans only a small fraction of the entire database) in order to converge to the global solution. Communicating with only a small number of nodes makes the disclosed methods highly scalable and particularly suitable for databases partitioned among a large number of nodes. In some embodiments, the communication overhead of the LSD-ARM process is minimized by exchanging update messages between nodes only when necessary.

Experimental results using a computer simulation of a database partitioned among several thousand nodes are presented hereinbelow. Simulated results demonstrate the locality, convergence and communication overhead characteristics of the disclosed LSD-ARM methods.

The disclosed methods may be extended to the general case of evaluating a global condition in a distributed database using a local process carried out by the different computing nodes.

There is therefore provided, in accordance with an embodiment of the present invention, a method for discovering association rules in a distributed database that includes a plurality of partitions associated with respective computing nodes, the method including:

generating a candidate association rule defining an association relationship between itemsets in the distributed database; and at each node among at least a subset of the nodes, applying an asynchronous fully-distributed majority voting process to assess a correctness of the candidate association rule.

In an embodiment, applying the majority voting process includes running one or more majority voting instances that estimate at least one of a global frequency and a global confidence of the candidate association rule. Additionally or alternatively, applying the majority voting process includes maintaining an ad-hoc solution including a list of association rules estimated to be correct, and iteratively updating the ad-hoc solution responsively to at least one of the estimated global frequency and the estimated global confidence.

In another embodiment, the association relationship is represented as a first itemset implying a second itemset, both itemsets including items, and generating the candidate association rule includes:

identifying in the ad-hoc solution a pair of association rules having equal first itemsets and second itemsets that differ only in a single item; and generating the candidate association rule such that the first itemset of the candidate associate rule is equal to the first itemsets of the pair of association rules and the second itemset of the candidate association rule is equal to the union of second itemsets of the pair of association rules.

In yet another embodiment, applying the majority voting process includes updating at least one of the estimated global frequency and the estimated global confidence responsively to an event including at least one of reception of a communication message from a neighbor node, addition of a neighbor node, removal of a neighbor node and a change in a local partition associated with the node performing the majority voting process. Additionally or alternatively, applying the majority voting process includes exchanging a communication message with a neighbor node so as to coordinate the estimated global frequency and confidence.

In still another embodiment, exchanging the communication message includes sending a communication message to the neighbor node only when a disagreement occurs with the neighbor node regarding at least one of the global frequency and the global confidence, thereby reducing a communication rate among the nodes.

In an embodiment, applying the majority voting process includes evaluating at least one of a local frequency and a local confidence of the candidate association rule in a local partition associated with the node applying the majority voting process.

There is also provided, in accordance with an embodiment of the present invention, a method for data mining in a distributed database that includes multiple partitions associated with respective computing nodes, the method including:

defining a global condition relating to at least part of the distributed database;

at each node among a plurality of the nodes, evaluating a local estimate of the global condition by exchanging messages with only a subset of the nodes in the plurality and determining the local estimate responsively to at least some data in the partition associated with the node and at least one of the exchanged messages;

at each node in the plurality, evaluating a local condition responsively to at least some of the exchanged messages; and when the local condition is fulfilled, exchanging at least one additional message with at least one node in the subset of the nodes.

In an embodiment, evaluating the local estimate includes exchanging the messages with at least one node in the subset of the nodes responsively to a disagreement among the local estimates evaluated by the nodes in the subset.

In another embodiment, evaluating the local estimate includes exchanging the messages responsively to at least one of a change in at least one of the partitions, a failure of at least one of the nodes, and a recovery of at least one of the nodes.

In yet another embodiment, defining the global condition includes defining at least one of a frequency and a confidence of an association rule in the distributed database, and evaluating the local condition at each node includes assessing at least one of the frequency and the confidence of the association rule in the partition associated with the node.

There is additionally provided, in accordance with an embodiment of the present invention, apparatus for mining association rules, including:

a plurality of storage devices, adapted to hold respective partitions of a database; and a corresponding plurality of computing nodes, each node associated with a respective one of the storage devices and coupled to communicate over a communication network with neighbor nodes among the plurality of computing nodes, each node in at least a sub-set of the nodes being adapted to generate a candidate association rule defining an association relationship between itemsets in the database and to apply an asynchronous fully-distributed majority voting process to assess a correctness of the candidate association rule.

There is further provided, in accordance with an embodiment of the present invention, a computer software product for mining association rules using computing nodes that are associated with respective storage devices holding respective partitions of a database and are coupled to communicate over a communication network with neighbor nodes among the plurality of computing nodes, the product including a computer-readable medium, in which program instructions are stored, which instructions, when read by the computing nodes, cause the nodes to generate a candidate association rule defining an association relationship between itemsets in the database and to apply an asynchronous fully-distributed majority voting process to assess a correctness of the candidate association rule.

There is also provided, in accordance with an embodiment of the present invention, a computer software product for mining data using computing nodes that are associated with respective storage devices holding respective partitions of a database and are coupled to communicate over a communication network with neighbor nodes among the plurality of computing nodes, the product including a computer-readable medium, in which program instructions are stored, which instructions, when read by the computing nodes, cause each node to accept a definition of a global condition relating to at least part of the distributed database, to assess a local condition of the partition associated with the node, and to evaluate an estimate of the global condition by exchanging messages with at least one of the neighbor nodes and determining the estimate responsively to the assessed local condition and the exchanged messages.

The present invention will be more fully understood from the following detailed description of the embodiments thereof, taken together with the drawings in which:

DETAILED DESCRIPTION OF EMBODIMENTS

System Description

Figure 1:
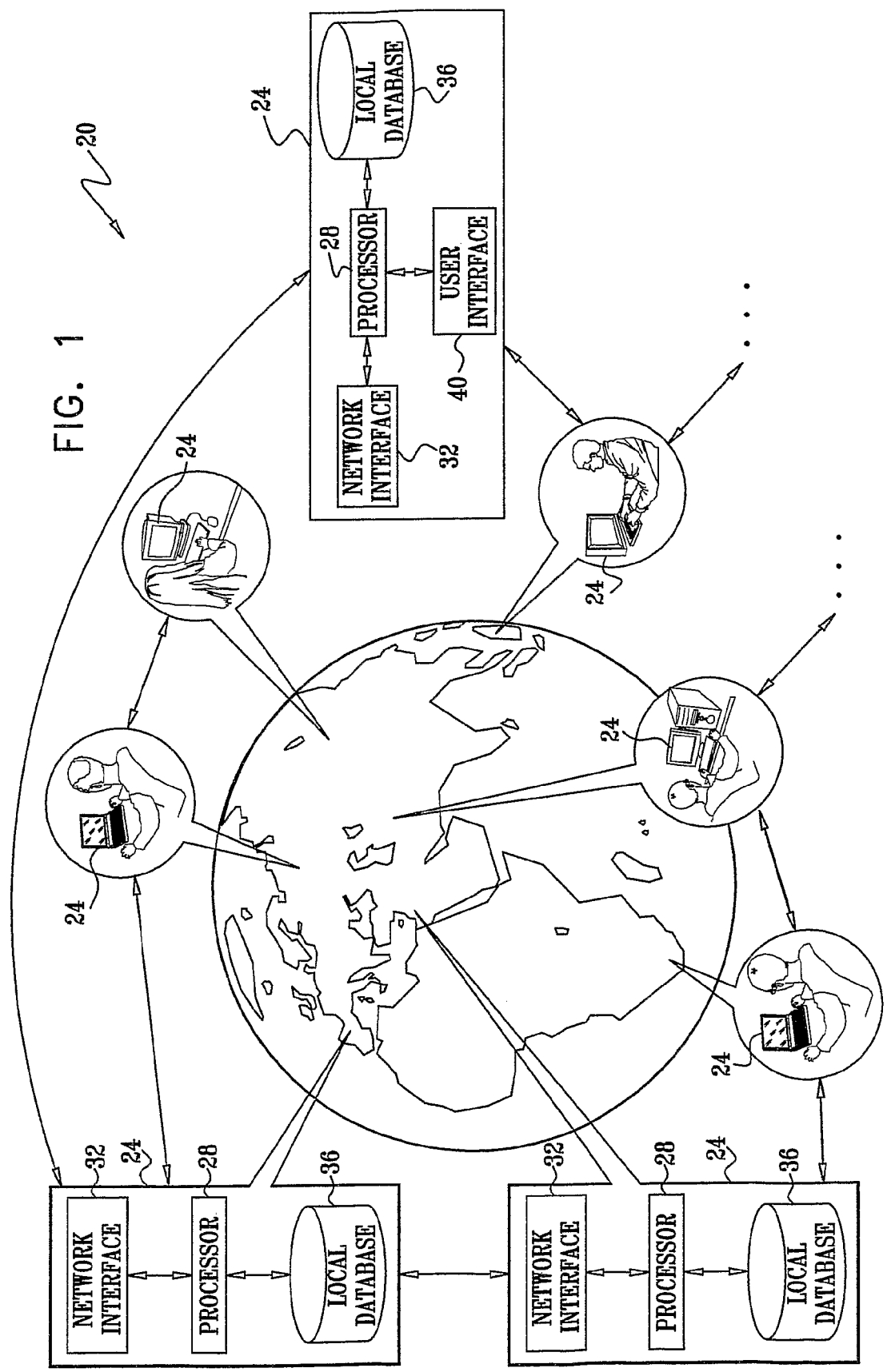
FIG. 1 is a block diagram that schematically illustrates a computer network, in accordance with an embodiment of the present invention.

FIG. 1 is a block diagram that schematically illustrates a computer network 20, in accordance with an embodiment of the present invention. Network 20 comprises a plurality of computing nodes 24. Each node 24 comprises a processor 28, which performs the various computing functions of the node, and a network interface 32, enabling the node to communicate and exchange information with other nodes of network 20. Each node 24 stores local information in a local memory, such as a local database 36. The term "database" is used broadly in the present patent application and in the claims and should be understood to comprise any sort of computer-readable data repository, not limited to any particular type of data structure.

In some aspects of its operation, network 20, and in particular the plurality of local databases 36, functions as a large-scale distributed (LSD) database. In some embodiments, processor 28 of each node 24 continuously discovers association rules that apply to the data stored in the plurality of local databases 36 across network 20, using methods that are described in detail hereinbelow. Although some embodiments of the present invention are particularly suitable for large networks comprising many thousands of nodes, the methods and systems described herein can be used in networks of any size. In some cases, nodes 24 are spread out over a wide geographic area. In other cases, nodes 24 are confined to a specific location.

Typically, each node 24 communicates with a relatively small number of the nodes of network 20. The nodes with which each node can communicate are referred to as its neighbors. (The fact that two nodes are defined as neighbors does not generally imply any physical or geographical proximity between them.) The neighbor relationship between nodes is assumed to be bi-directional. In other words, if a node denoted u can communicate with a node denoted v, then node v can also communicate with node u.

The plurality of local databases 36 can be viewed collectively as a distributed database, whose information is distributed across the different local databases. In many applications, an integrated view of the information stored across the distributed database provides a powerful analysis tool. For example, network 20 may comprise a medical computer system of a health maintenance organization (HMO). In some embodiments, such medical networks integrate medical data stored in local databases distributed across thousands of clinics and other locations. HMOs perform data mining over this distributed database for epidemic control, ailment and treatment pattern discovery and detection of medical fraud or misconduct.

Another use of data mining over a widely-distributed database is in peer-to-peer systems, such as file-sharing networks. For example, in the Gnutella file-sharing network, several million users reveal the files they store locally on their computers and gain access to files stored by other users in return. The distributed collection of locally-stored files can also be viewed as a distributed database. Analyzing user preferences by performing data mining over this distributed database can provide valuable information that can be put to operational or commercial use. Other large-scale distributed systems include, for example, the Condor system developed by the University of Wisconsin (Madison, Wis.), which includes over 20,000 computers. Details regarding this system are available at www.cs.wisc.edu/condor. Another peer-to-peer system is the SETI@home system, an experimental system developed by the University of California (Berkeley, Calif.) that uses over 1,800,000 Internet-connected computers to analyze radio-telescope data in search of extraterrestrial intelligence. Details regarding the SETI@home system are available at www.setiathome.ssl.berkeley.edu.

Data mining over large-scale distributed databases can also be used for other applications, such as detecting spam in electronic mail systems, identifying and preventing distributed denial of service (DDoS) virus attacks in computer networks. Additional applications may comprise network monitoring, failure determination in distributed systems, load prediction and balancing, on-the-fly resource allocation, social-networking in cyber-communities, or any other task that requires analysis of distributed data.

Typically, processors 28 of nodes 24 comprise general-purpose computers, which are programmed in software to carry out the functions described herein. The software may be downloaded to the computers in electronic form, over network 20, for example, or it may alternatively be supplied to the computers on tangible media, such as CD-ROM. Further alternatively, processors 28 may be implemented using a combination of hardware and software elements, for example, in sensor networks.

Association Rule Mining

One example of a data mining application is association rule mining (ARM). In general, the ARM problem is formulated as follows: Let $I=\{i_1, i_2, \ldots, i_m\}$ be a set of items in a certain domain (e.g., files in a file-sharing system or products in an retail application). An itemset X is any subset of I, $X \subseteq I$. Each database denoted DB stores a list of transactions denoted t. A transaction is also a subset of I, $t \subseteq I$. For example, in a retail application, database DB stores a list of purchases (transactions) made by customers, wherein each transaction comprises the set of items purchased. Often, each transaction is associated with a unique transaction identifier (TID). The number of transactions in database DB is denoted |DB|.

Given an itemset X and a database DB, the number of transactions in DB that contain all the items of X is denoted Support(X,DB). The frequency of itemset X in database DB is defined as Freq(X,DB)=Support(X,DB)/|DB|, $0 \leq$ Freq(X,DB)$\leq 1$. An itemset X is said to be frequent in database DB if its frequency exceeds a predetermined frequency threshold denoted MinFreq (i.e., Freq(X,DB)$\geq$MinFreq). Otherwise, X is said to be infrequent in DB.

An association rule identifies situations in which the presence of an itemset X in a transaction predicts, with a certain confidence level, the presence of another itemset Y in the same transaction. (For example, in the retail application, an association rule may state that "people who buy beer also buy cigarettes." In the file-sharing application, an association rule may state that "people who downloaded the movie 'Jaws' also downloaded songs by the Beatles.")

For a predetermined confidence level threshold $0 \leq$ MinConf$\leq 1$, rule $X \Rightarrow Y$ is said to be confident in database DB if Freq(X$\cup$Y,DB)$\geq$MinConf·Freq(X,DB). For example, if MinConf=0.8 then at least 80% of the transactions in which itemset X appears should also contain itemset Y, in order for the rule $X \Rightarrow Y$ to be considered confident.

If both itemsets X and X∪Y are frequent in DB, and the association rule X⇒Y is confident in DB, the rule is referred to as true, or correct. Otherwise, the rule is considered false. A solution to the ARM problem formulated above is a list of all true association rules in DB, denoted R[DB].

Rule Mining in Distributed Systems

In some ARM applications, database DB is distributed across a large number of local databases, such as local databases 36 of network 20. In these cases, the ARM problem is referred to as a large-scale distributed ARM (LSD-ARM) problem. LSD-ARM has several unique characteristics. For example, transactions may be added to or deleted from database DB over time. Database DB is partitioned into a large number of local databases 36, sometimes reaching millions of databases. The total number of local databases 36 is sometimes unknown and may change over time. Each node can reach and communicate with one or more neighbor nodes. The number of neighbor nodes and their identity may also change over time. Furthermore, nodes 24 with their local databases 36, as well as communication links between nodes, may fail and recover at any time.

For any node 24 denoted u, the partition of database DB stored in local database 36 of this node at time t is denoted $DB_t^u$. Let $[u]_t$ denote the set of neighboring nodes of node u at time t. (In other words, $[u]_t$ is the set of nodes reachable by node u for exchanging data at time t.) Since the neighbor relationship between nodes is assumed bidirectional, we can write $v \in [u]_t \Leftrightarrow u \in [v]_t$.

For any node u, a local solution to the LSD-ARM problem at time t is defined as a list of all association rules that are true in the combined local databases 36 reachable from u at time t (i.e., all databases 36 of the nodes in $[u]_t$). This local solution is denoted $R[u]_t$. Since both $[u]_t$ and $DB_t^v$ of any $v \in [u]_t$ are free to vary over time, so does the local solution $R[u]_t$. In some embodiments that are described hereinbelow, each node u evaluates an ad-hoc solution denoted $\tilde{R}[u]_t$, which estimates $R[u]_t$. The performance of the estimation is often measured by recall and precision metrics, both taking values between zero and unity and defined as:

$$\text{Recall} = \frac{|R[u]_t \cap \tilde{R}[u]_t|}{|R[u]_t|} \quad [1]$$

$$\text{Precision} = \frac{|R[u]_t \cap \tilde{R}[u]_t|}{|\tilde{R}[u]_t|}$$

It will be shown below that if the system behavior is such that both $[u]_t$ and $DB_t^v$ of any $v \in [u]_t$ remain static for a sufficiently long period of time, ad-hoc solution $\tilde{R}[u]_t$ converges to the local solution $R[u]_t$. (In other words, both the recall and precision converge to unity.)

In the description that follows, it is assumed that there is at most one path connecting each pair of nodes u and v. Nodes may be added or deleted from the system over time (for example, as a result of node crash and recovery). Communication links between nodes may be similarly added or deleted at any time. It is assumed, however, that each node is informed of the correct status of its neighbor nodes and communication links.

LSD-ARM Method Description

We shall now describe a method for mining association rules in a large-scale distributed database, such as network 20 described above, in accordance with an embodiment of the present invention. The method is particularly suitable for mining association rules in databases that are widely distributed among a large number of nodes 24 (LSD-ARM).

Figure 2:
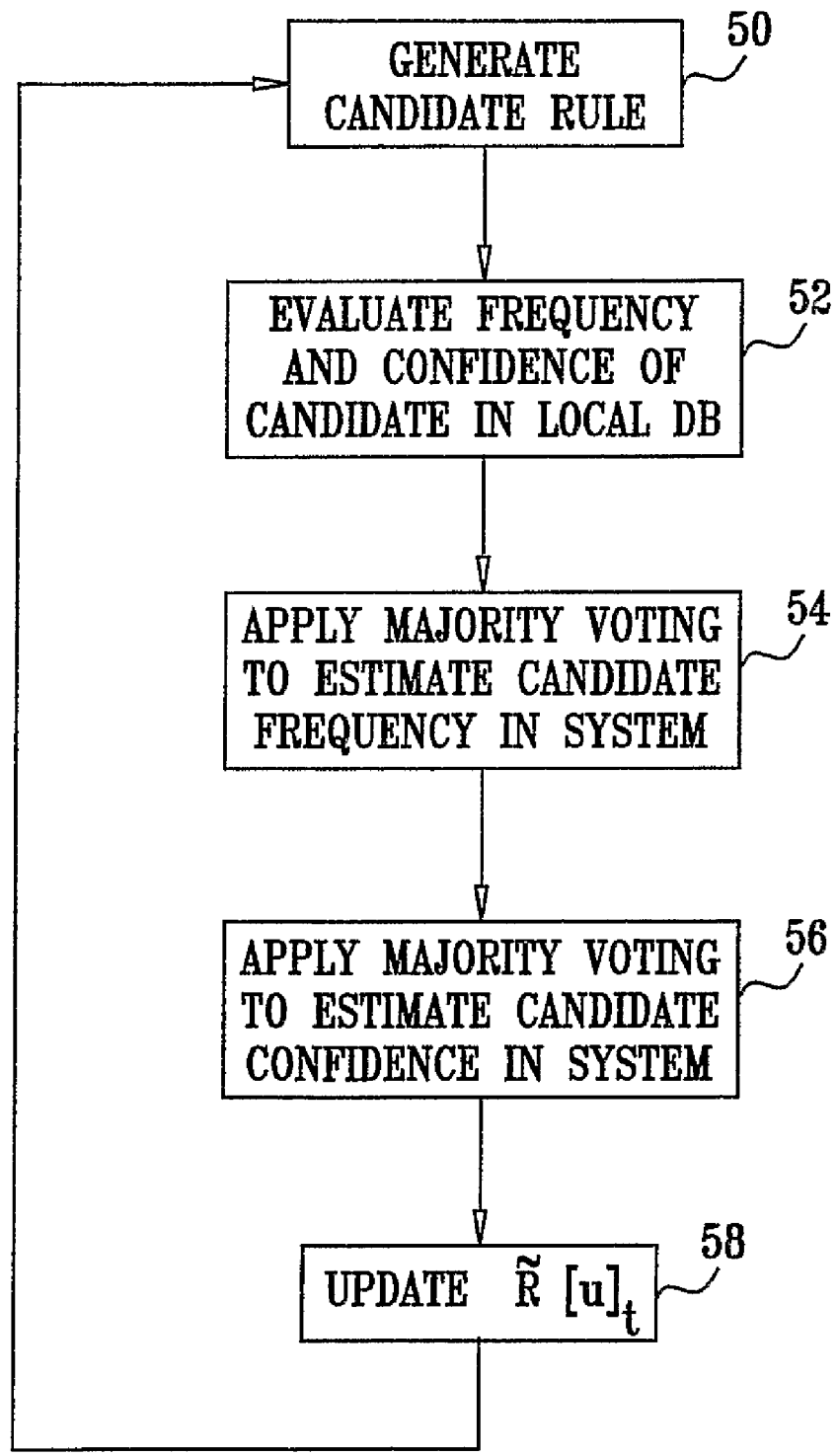
FIG. 2 is a flow chart that schematically illustrates a method for large-scale distributed association rule mining (LSD-ARM), in accordance with an embodiment of the present invention.

In principle, the methods described in FIGS. 2 and 3 below represent the rule mining process as a distributed majority voting process carried out separately by each node 24. As part of this process, each node 24 generates candidate association rules. The node then exchanges information with its neighbors, who also perform a similar process, in order to estimate the frequency and confidence of each candidate association rule. In some embodiments, the process described in FIG. 2 is carried out continuously or periodically by each node 24 in network 20. As a result, each node denoted u continuously updates its ad-hoc solution $\tilde{R}[u]_t$ comprising a list of association rules that are true in the combined local databases 36 of $[u]_t$. Such process, in which each node constantly maintains an estimated ad-hoc solution, is sometimes referred to as an "anytime" process.

FIG. 2 is a flow chart that schematically illustrates a method for large-scale distributed association rule mining (LSD-ARM), in accordance with an embodiment of the present invention. In some embodiments, each node 24 carries out the method of FIG. 2 asynchronously of other nodes. An instance of the method is performed for each candidate association rule being evaluated, as explained below. The method description refers to a particular node 24 denoted u and to a single candidate rule.

The method begins with node u generating a candidate association rule, at a candidate generation step 50. Any suitable method can be used to generate candidate association rules. In some embodiments, node u periodically examines some or all of the true rules in $\tilde{R}[u]_t$ and uses them to generate new candidate rules. An exemplary process that can be used for this purpose is described by Brin et al. in "Dynamic Itemset Counting and Implication Rules for Market Basket Data," Proceedings of the 1997 ACM SIGMOD International Conference on Management of Data, Tucson, Ariz., June 1997, pages 255-264, which is incorporated herein by reference.

In some embodiments, it is desirable for the candidate generation process to limit the number of candidate rules and to avoid superfluous rules as much as possible. In an exemplary process that can be used as part of step 50, node u generates initial candidate rules of the form $\phi \Rightarrow \{i\}$ for every $i \in I$, wherein $\phi$ denotes the empty set. Then, for each rule $\phi \Rightarrow X$ in $\tilde{R}[u]_t$ (i.e., for every rule of this form that is considered true), node u generates candidate rules of the form $X \setminus \{i\} \Rightarrow \{i\}$ for every $i \in X$. In addition to these initial candidate rules, node u searches $\tilde{R}[u]_t$ for pairs of rules having the same left-hand-side terms and having right-hand-side terms that differ only in the last item (i.e., rule pairs of the form $X \Rightarrow Y \cup \{i_1\}$ and $X \Rightarrow Y \cup \{i_2\}$). Having identified such pair of rules in $\tilde{R}[u]_t$, node u verifies that the rules $X \Rightarrow Y \cup \{i_1, i_2\} \setminus \{i_3\}$ are also true for every $i_3 \in Y$ and then generates the candidate rule $X \Rightarrow Y \cup \{i_1, i_2\}$. Using this exemplary process, and assuming $\tilde{R}[u]_t$ originally contains only true rules, it can be shown that node u does not generate any superfluous candidate rules. A similar process, used for generating itemsets rather than candidate rules, is described in the paper by Argawal and Srikant cited above.

In some embodiments, the nodes explicitly or implicitly coordinate the generation of candidate rules among them. Typically, each node starts off with the candidate rules that are frequent (confident) in its own local database 36. If a node receives a message regarding a candidate rule that is as yet unknown to it (e.g., one which is infrequent in its local database), it creates the candidate rule and computes its local frequency. Consider a candidate rule R which was created by node u but not by node v, and which is globally frequent. At some stage, node v is likely to receive an update message regarding rule R and therefore create the rule. Furthermore, by correctness of the majority voting method, at some stage node v is likely to compute that R is frequent and thus add it to its ad-hoc solution. After adding R to the ad-hoc solution, node v is able to generate additional candidates such as R∪{i}. In other words, the eventual correctness of the majority voting process assures that each frequent association rule, starting from basic rules and growing, will eventually be computed by all nodes.

For every candidate association rule generated at step 50 above, node u evaluates the frequency and confidence of the rule in its local database 36, at a local evaluation step 52. In some embodiments, node u counts the number of itemsets in its local database that comply with the candidate rule to determine the rule's frequency and confidence. Alternatively, any other suitable method for evaluating or estimating the frequency and confidence of the candidate rule can be used.

Node u evaluates the global frequency of the candidate rule in network 20, at a global frequency evaluation step 54. In some embodiments, node u performs a distributed majority voting process by exchanging messages with its neighbors in order to estimate the global frequency of the candidate rule. A detailed description of an exemplary distributed majority voting process that can be used for this purpose is described in FIG. 3 below.

Node u evaluates the global confidence of the candidate rule in network 20, at a global confidence evaluation step 56. In some embodiments, node u invokes another instance of the distributed majority voting process of FIG. 3, with different parameters, in order to estimate the global confidence of the candidate rule. The different parameter values provided to the instances of method of FIG. 3 for frequency and confidence estimation are described further below.

Based on the results of steps 54 and 56 above, node u updates its ad-hoc solution $\tilde{R}[u]_t$, at a solution updating step 58. In some embodiments, if the results of the two majority voting instances indicate that the candidate rule is confident and true, node u adds this rule to $\tilde{R}[u]_t$. Otherwise, the rule is discarded. In general, it is possible that a rule that was discarded as false will be re-generated at a later time as a candidate and will become true because of changes occurring in network 20 over time.

Typically, the process of generating candidate rules and evaluating their correctness described in FIG. 2 is repeated indefinitely (either continuously or periodically) by each node 24. As a result, each node 24 constantly maintains an up-to-date version of its ad-hoc solution $\tilde{R}[u]_t$. As noted above, if network 20 is stable for a sufficiently long period of time, this ad-hoc solution converges to the local solution $R[u]_t$.

Figure 3:
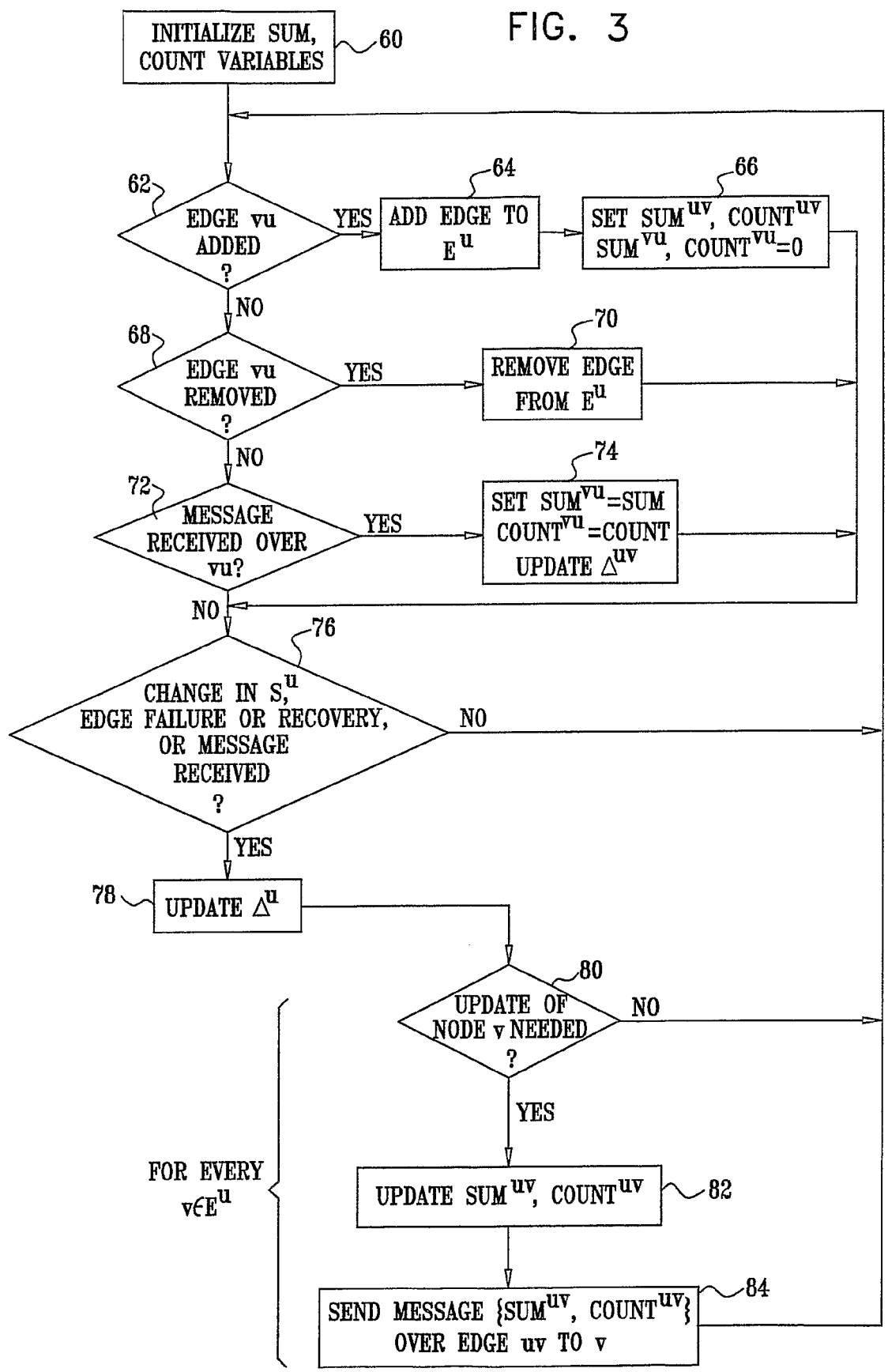
FIG. 3 is a flow chart that schematically illustrates a method for distributed majority voting, in accordance with an embodiment of the present invention.

FIG. 3 is a flow chart that schematically illustrates a method for distributed majority voting, in accordance with an embodiment of the present invention. In some embodiments, an instance of the method of FIG. 3 is carried out individually and asynchronously by each node 24 in network 20 for every candidate rule being evaluated. Instances of this method enable each node to conclude, by exchanging information with their neighbors, whether a particular candidate rule is globally frequent, confident and/or true in the entire network 20.

In contrast to some distributed majority voting methods that use broadcast messages and centralized synchronization between the nodes, the method of FIG. 3 is fully distributed. This property makes the method highly scalable and particularly suitable for large-scale distributed applications, such as peer-to-peer systems. As will be demonstrated below, the majority voting process is highly local. In other words, each node 24 needs to communicate with only a small percentage of the other nodes in the system. This locality property reduces the communication overhead of the process and contributes to its scalability, making it particularly suitable for use in very large networks.

In the method of FIG. 3, network 20 is represented as a graph, whose nodes represent nodes 24 and edges represent the communication links between nodes. Each node denoted u is connected with its neighbors via a set of edges denoted $E^u$. The description that follows demonstrates the use of the method by a particular node u for estimating the global frequency of a candidate rule. The adaptation of the method for estimating confidence is explained further below.

In general, majority voting is performed over the transactions in databases 36, wherein each transaction can vote "1" or "0". Each node u sends and receives messages to and from its neighbors, informing them of its current knowledge about the global majority voting status. A message sent from node u to node v has the form $\{sum^{uv}, count^{uv}\}$, wherein $count^{uv}$ denotes the number of transactions the message reports, and $sum^{uv}$ denotes the number of transactions that vote "1". Since the majority voting process is carried out separately for every candidate rule, in some embodiments the messages between nodes also comprise a rule identifier field that identifies the candidate rule to which the message corresponds.

Each node u records for every neighbor v the last message $\{sum^{uv}, count^{uv}\}$ sent to node v, and the last message $\{sum^{vu}, count^{vu}\}$ received from node v. In addition, node u records the size of its local database 36 in a variable denoted $c^u$, and the number of transactions in the local database that comply with the candidate rule in a variable denoted $s^u$.

Based on these variables, node u maintains two functions denoted $\Delta^u$ and $\Delta^{uv}$ defined as:

$$\Delta^u = s^u + \sum_{vu \in E^u} sum^{vu} - \lambda \left( c^u + \sum_{vu \in E^u} count^{vu} \right) \quad [2]$$

$$\Delta^{uv} = sum^{uv} + sum^{vu} - \lambda(count^{uv} + count^{vu}) \quad [3]$$

wherein λ denotes the desired majority ratio. When estimating rule frequency, MinFreq is substituted for λ. $\Delta^u$ thus measures the number of excess "1" votes node u has been informed of. $\Delta^{uv}$ measures the number of excess "1" votes nodes u and v have last reported to one another.

At any point in time, if $\Delta^u \geq 0$, node u concludes that the percentage of transactions reported to it that voted "1" is higher than λ (MinFreq), thereby deciding that the candidate rule is frequent. Otherwise, node u assumes the rule is infrequent. As will be shown below, $\Delta^{uv}$ is re-calculated whenever a message from node v is received by node u. $\Delta^u$ is re-calculated when either a message is received by node u, transactions are added or deleted from the local database of node u, and whenever a neighbor node is added or removed.

The method of FIG. 3 begins with processor 28 of node u initializing the sum and count variables, at an initialization step 60. For each edge vu∈$E^u$, variables $sum^{uv}$, $count^{uv}$, $sum^{vu}$ and $count^{vu}$ are set to zero. Then, processor 28 of node u constantly monitors its environment (i.e., its neighbors) to detect changes requiring an update of $\Delta^u$, $\Delta^{uv}$ and/or the sum and count variables.

Node u checks whether a new neighbor node v is added, at a neighbor addition step 62. The newly-joining neighbor may be, for example, a node recently added to the network or a node recovering from a previous crash or failure. If a new neighbor node v is detected, processor 28 adds a new edge vu to $E^u$, at an edge addition step 64. Processor 28 initializes variables $sum^{uv}$, $count^{uv}$, $sum^{vu}$ and $count^{vu}$ to zero, at a joining node initialization step 66.

Otherwise, node u checks whether a neighbor node v has been removed, at a neighbor deletion step 68. A neighbor may be removed, for example, as a result of a crash or other failure. If a neighbor node v is removed, processor 28 removes edge vu from $E^u$, at an edge deletion step 70.

Node 24 checks whether a message from a neighbor node is received, at a message checking step 72. If a message is received from neighbor node v over edge vu, processor 28 of node u updates $sum^{vu}$, $count^{vu}$ and $\Delta^{uv}$, at a received message updating step 74. Processor 28 sets $sum^{vu}$=sum and $count^{vu}$=count, wherein sum and count denote the two values received from node v in the message {sum, count}. $\Delta^{uv}$ is calculated in accordance with equation [3] above.

Node 24 then checks whether either a change in $s^u$ occurred, a neighbor node was removed or added, or whether a message was received, at an event checking step 76. If none of these events occurred, the method loops back and continues to check for changes.

If any one of these events occurred, processor 28 calculates an updated value of $\Delta^u$, at a $\Delta^u$ recalculation step 78. $\Delta^u$ is calculated in accordance with equation [2] above. Node 24 then checks, for each neighbor node v in $E^u$, whether it is desirable to send an update message to this node as a result of the event, at an update checking step 80. In some embodiments, not every event in the environment of node u automatically causes an update message to be sent to its neighbors. In the interest of reducing communication overhead, a message is sent only when necessary. For example, a message may be sent whenever nodes u and v disagree on the overall result of the majority vote (i.e., when the signs of $\Delta^u$ and $\Delta^v$ are different). In some embodiments, processor 28 of node u concludes that an update message is necessary if ($count^{uv}$+$count^{vu}$=0 and $\Delta^u \geq 0$) or ($count^{uv}$+$count^{vu}$>0 and either ($\Delta^{uv}$<0 and $\Delta^u$>$\Delta^{uv}$) or ($\Delta^{uv}$>0 and $\Delta^u$<$\Delta^{uv}$)).

Node u coordinates its majority assumption with node v by maintaining the same $\Delta^{uv}$ value ($\Delta^{uv}$=$\Delta^{vu}$) and by making sure that $\Delta^{uv}$ does not mislead node v to conclude that the majority voting result is higher than it actually is. In other words, as long as $\Delta^u \geq \Delta^{uv} \geq 0$ and $\Delta^v \geq \Delta^{vu} \geq 0$, there is typically no need for nodes u and v to exchange messages. If, on the other hand, $\Delta^{uv}$>$\Delta^u$, then node v might erroneously calculate $\Delta^v \geq 0$ because it did not receive an update message from node u. Therefore, in this case an update message is desirable. Once the message is sent, $\Delta^{uv}$=$\Delta^u$. The opposite case in which $\Delta^{vu}$<0 is handled in a similar manner.

When no update messages are sent, it can be shown that $\Delta^v$ has the same sign for every v∈$E^u$, i.e., all nodes in $[u]_t$ agree on the global result of the majority vote. If, on the other hand, there is any disagreement on the global result within $[u]_t$, there exist two neighboring nodes that disagree on the sign of $\Delta^v$, in which case an update message will be sent. Using this mechanism, neighboring nodes reach a mutual consensus, or agreement, regarding the global majority voting result. Communication messages are sent only when neighboring nodes disagree, for the purpose of re-establishing the consensus.

If the result of update checking step 80 is that an update is necessary, processor 28 of node 24 calculates updated values of $sum^{uv}$ and $count^{uv}$, at a variable updating step 82. Node 24 then sends to node v a message containing the updated values of $sum^{uv}$ and $count^{uv}$, as calculated at step 82 above, at a message sending step 84. As noted above, steps 80-84 are repeated for every neighbor node v in $E^u$. Once all necessary update messages have been sent, the method loops back and node u continues to monitor its environment for changes.

As noted above, when using the method described above for estimating the global frequency of a candidate rule (such as in frequency evaluation step 54 of the method of FIG. 2 above), $c^u$ in equation [2] is set to the size of the local database 36 of node u, $s^u$ is set to the number of transactions in the local database that comply with the candidate rule, and λ is set to MinFreq.

When using the method described above for estimating the global confidence of a candidate rule of the form X⇒Y (such as in confidence evaluation step 56 of the method of FIG. 2 above), $c^u$ in equation [2] is set to the number of transactions in the local database 36 of node u that contain itemset X, $s^u$ is set to the number of transactions in the local database that contain both itemsets X and Y, and λ is set to MinConf.

In some embodiments, when the candidate rule is of the form A⇒B\A, only one instance of the majority voting process should be invoked. For itemset B, an initial majority voting instance determines whether φ⇒B is correct (i.e., whether the frequency of B is above MinFreq). Then, for every subset A of B, a single majority voting instance determines whether the rule A⇒B\A is confident (provided that this candidate was generated).

Experimental Results

In order to demonstrate the effectiveness of the disclosed methods and systems, the inventors have implemented a simulated environment that simulates large-scale distributed databases comprising up to several thousands of nodes. The LSD-ARM method of FIG. 2 above was demonstrated and tested on a simulated network comprising 1600 nodes laid on a 40×40 grid. The majority-voting method of FIG. 3 above was tested on a simulated network comprising 10,000 nodes laid on a 100×100 grid.

Three transaction databases were used in the simulations:

| Database | Number of transactions | Average transaction length | Average pattern length |
|---|---|---|---|
| T5.I2 | 10,000,000 | 5 | 2 |
| T10.I4 | 10,000,000 | 10 | 4 |
| T20.I6 | 10,000,000 | 20 | 6 |

In the table, "transaction length" denotes the number of items in the transaction. The term "pattern length" is a figure-of-merit relating to the way recurring itemsets are introduced into the transactions, and has some relation to the expected length of frequent/confident itemsets in the database (In other words, the longer the pattern length, the longer the frequent/confident itemsets that are expected to appear). In all three databases the number of patterns was artificially reduced in order to increase the fraction of correct rules from approximately 1:10,000 to around 1:100. In each simulation, the transaction database was randomly partitioned (using uniform distribution) among the different nodes.

The majority voting method of FIG. 3 above, and consequently the LSD-ARM method of FIG. 2 above, are inherently local processes, typically requiring each node to communicate with only a small environment of neighbor nodes in order to converge to the correct global solution. The environment size of a particular node, in the case of the LSD-ARM method of FIG. 2, is defined as the percentage of the global database reported to this node during the LSD-ARM process. Experimentation shows that the environment size depends strongly on the significance of the candidate association rule. The significance of a rule is a measure of the deviation of the measured majority from the desired majority ratio $\lambda$, and is defined as:

$$\text{Significance} = \frac{\sum_{v \in [u]_t} s^v}{\lambda \sum_{v \in [u]_t} c^v} - 1 \quad [4]$$

Figure 4:
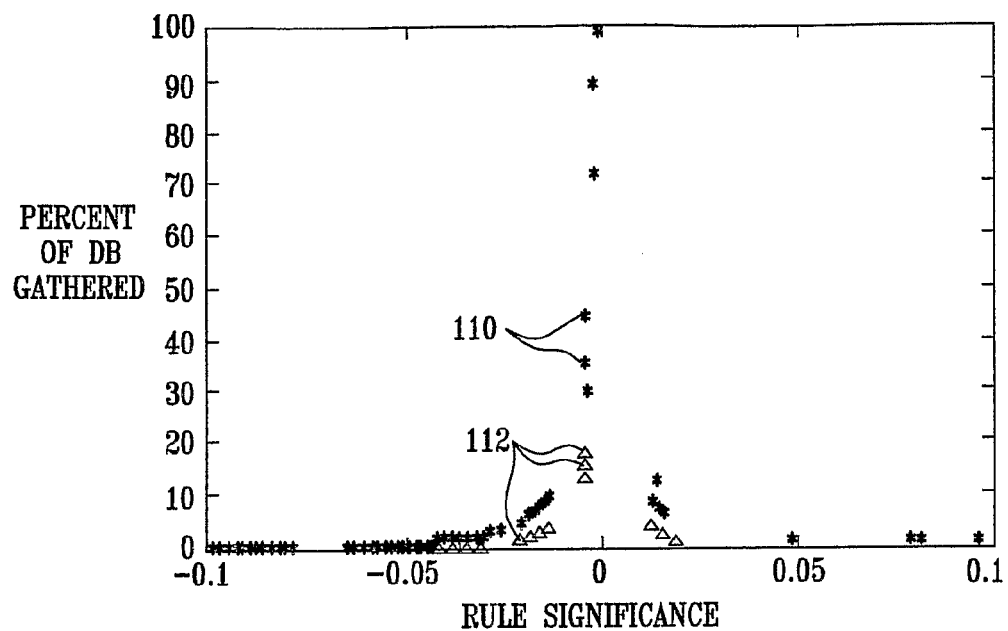
FIG. 4 is a plot that schematically illustrates simulated locality of the LSD-ARM method of FIG. 2 above, in accordance with an embodiment of the present invention.

FIG. 4 is a plot that schematically illustrates the simulated locality of the method of FIG. 2 above, in accordance with an embodiment of the present invention. The plot was derived from a simulation of a 40×40 grid of nodes using the T20.I6 transaction database described above. Data points 110 and 112 show the percentage of the global database reported to a particular node during the LSD-ARM process, as a function of the significance of the candidate rule being evaluated. Data points 110 show worst-case results (i.e., results of the worst-performing node), while data points 112 show average results (i.e., results of the average-performing node). It can be seen that as the rule significance deviates from zero (i.e., the actual majority voting result deviates from $\lambda$), the environment size drops sharply. Even for slight deviations of ~0.025, only a very small percentage of the database, if at all, needs to be gathered by the node in order to converge to the global solution.

Figure 5:
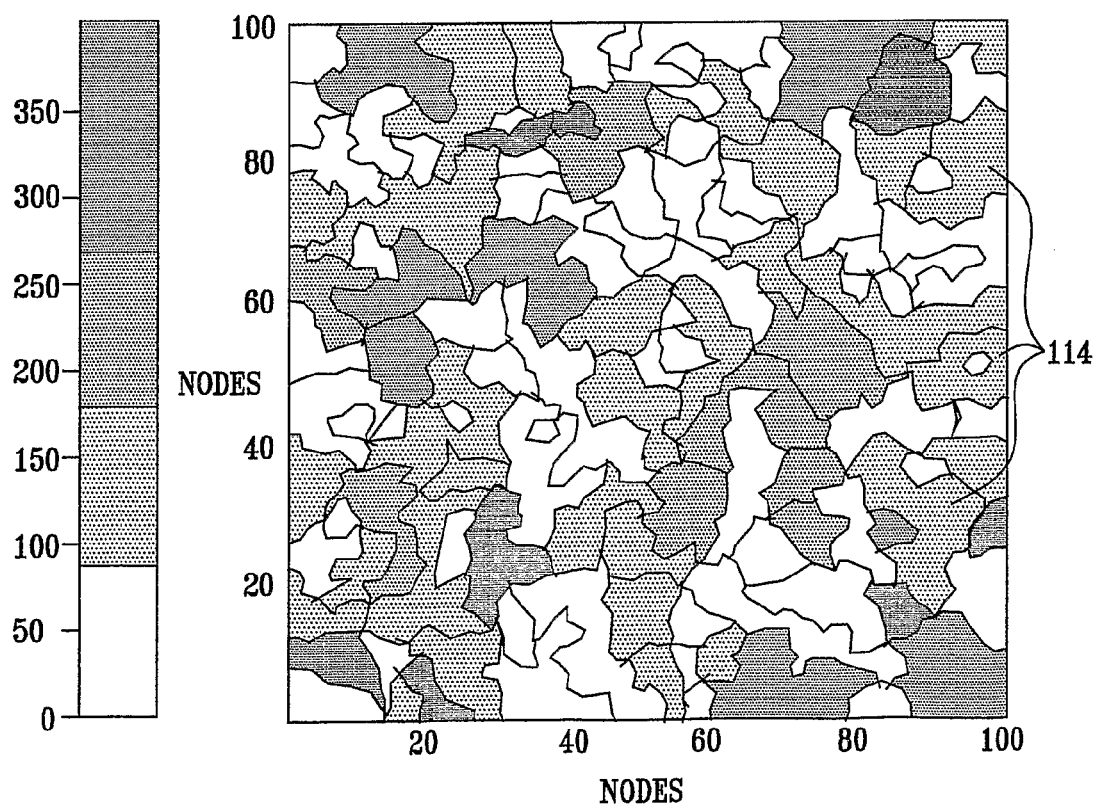
FIG. 5 is a contour plot that schematically illustrates simulated locality of the majority voting method of FIG. 3 above, in accordance with an embodiment of the present invention.

FIG. 5 is a contour plot that schematically illustrates simulated locality of the majority voting method of FIG. 3 above, in accordance with an embodiment of the present invention. The vertical and horizontal axes of the plot show the 100×100 grid of nodes used in the simulation. Contours 114 show, using a gray-scale, the number of nodes with which each particular node communicated during the LSD-ARM process. The rule significance in this example was 0.1. The distribution of environment size is shown to be random, implying that the LSD-ARM is fair, in the sense that the environment size of a node depends on the data, and not on the node's location or connectivity. Since the LSD-ARM method of FIG. 3 comprises two instances of the method of FIG. 2, the LSD-ARM method has similar locality characteristics.

Figure 6A:
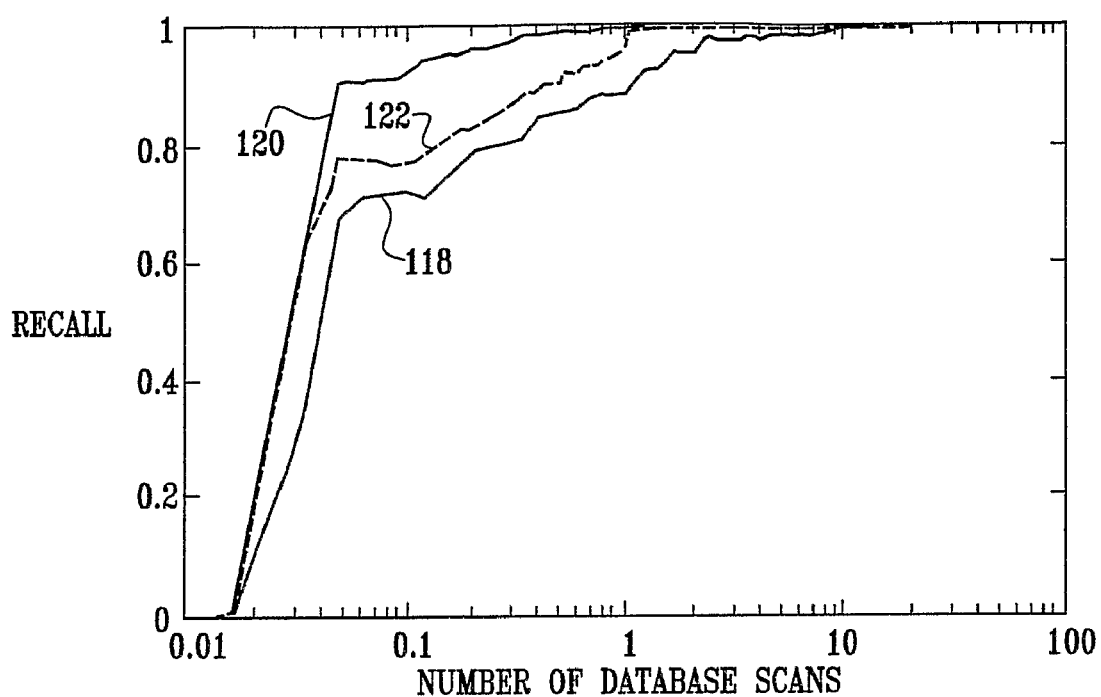
FIGS. 6A and 6B are plots that schematically illustrate simulated convergence characteristics of the LSD-ARM method of FIG. 2 above, in accordance with an embodiment of the present invention.
Figure 6B:
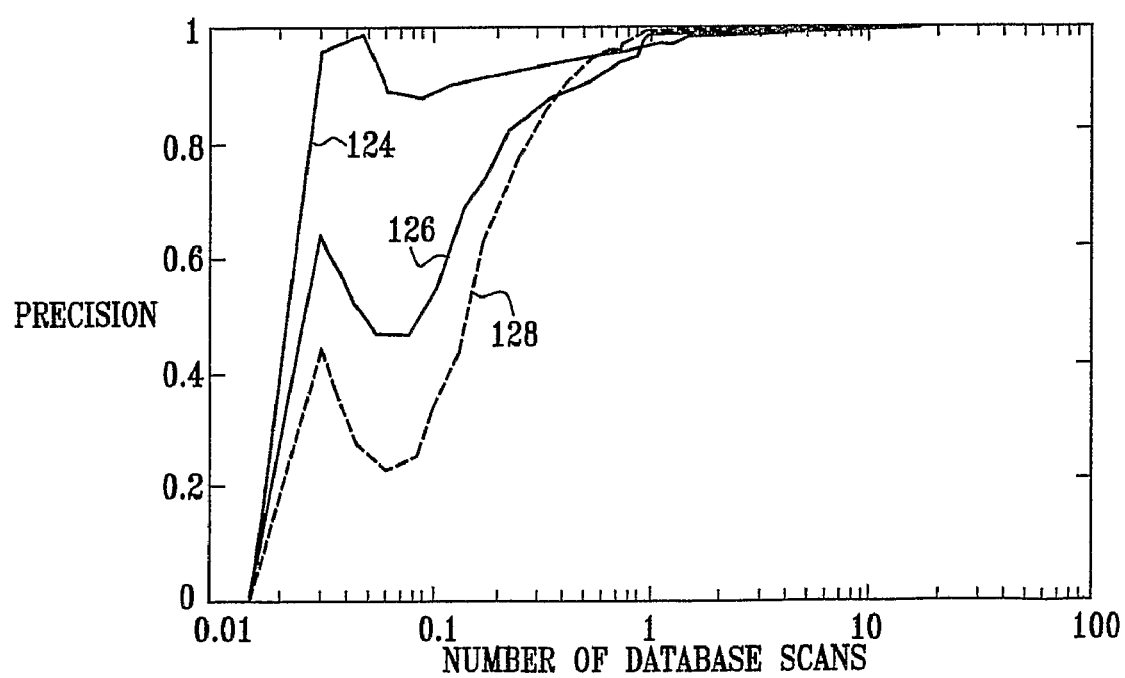

FIGS. 6A and 6B are plots that schematically illustrate simulated convergence characteristics of the LSD-ARM method of FIG. 2 above, in accordance with an embodiment of the present invention. FIG. 6A shows the convergence of the recall (the percentage of rules discovered, as defined in equation [1] above). Curves 118, 120 and 122 show the convergence of databases T5.I2, T10.I4 and T20.I6, respectively, as a function of the number of transactions scanned. (The number of transactions is expressed in terms of the percentage of the global database). FIG. 6B shows the convergence of the precision (the percentage of true rules out of the rules assumed correct, as defined in equation [1] above). Curves 124, 126 and 128 show the convergence of databases T5.I2, T10.I4 and T20.I6, respectively.

Figure 7:
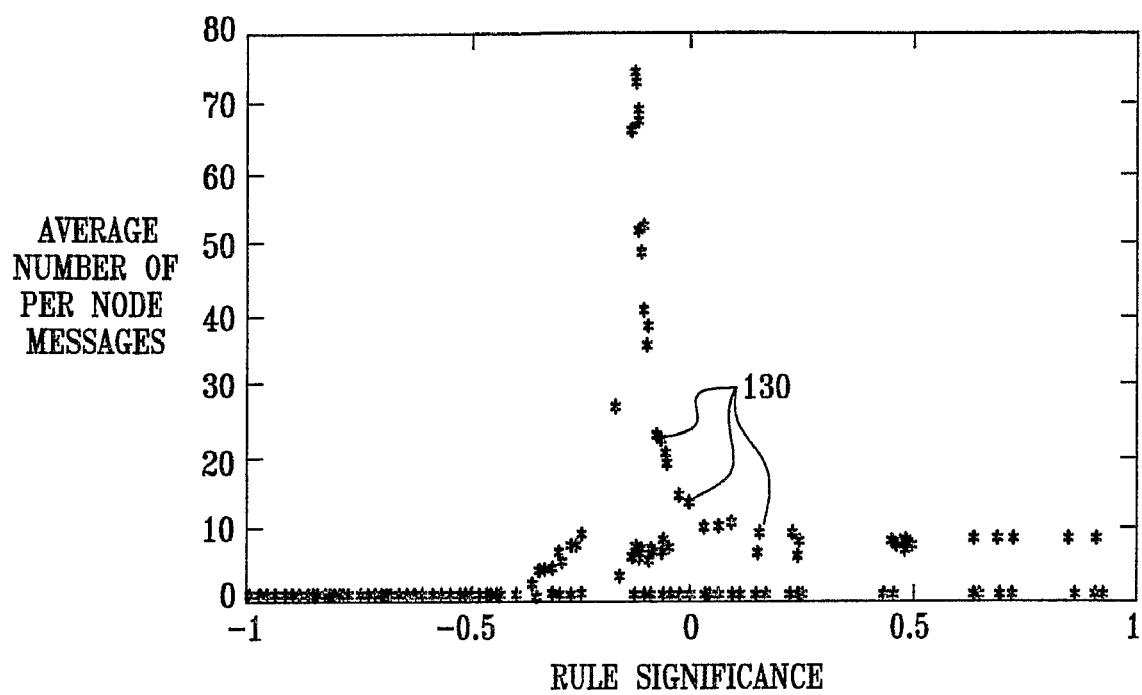
FIG. 7 is a plot that schematically illustrates simulated communication overhead of the LSD-ARM method of FIG. 2 above, in accordance with an embodiment of the present invention.

FIG. 7 is a plot that schematically illustrates simulated communication overhead of the LSD-ARM method of FIG. 2 above, in accordance with an embodiment of the present invention. Data points 130 show the average number of update messages sent per node, as a function of rule significance. Similarly to the behavior of the environment size, the communication overhead depends strongly on the rule significance and drops sharply when the rule significance reaches an order of ±0.5.

Although the methods and systems described herein mainly address distributed majority voting processes used for discovering association rules, the principles of the present invention can also be used in other data mining applications for estimating other sorts of global conditions in a distributed database using a local process carried out by the computing nodes. Adaptation of the disclosed methods and systems to perform any such data mining application will be apparent to those skilled in the art after reading the description given hereinabove.

In such alternative embodiments of the invention, each node assesses a local estimate of the global condition responsively to at least some of the data in its own local database 36, and to messages exchanged with neighbor nodes. Each node typically exchanges messages with its neighbors to coordinate their local estimate of the global condition. Each node estimates a local condition with respect to its local partition and the exchanged messages. If the local condition evaluates to true, additional messages are exchanged with the neighbor nodes.

In the case of association rule mining, the global conditions comprise the frequency and confidence of a candidate association rule in the entire distributed database. The local estimates approximate the global frequency and confidence of the rule based on the frequency and confidence of the rule in the local partition, and on the messages exchanged with neighbor nodes. The local condition may comprise, for example, the conditions described at update checking step 80 of the method of FIG. 3 above.

Each node thus maintains an ad-hoc solution, which is iteratively updated. The disclosed process is local, in the sense that each node typically communicates with a relatively small subset of neighbor nodes. As noted above, nodes typically exchange messages with their neighbors responsively to a disagreement regarding their estimate of the global condition. Once agreement is reached, no messages are exchanged, thus reducing the communication overhead.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for discovering association rules, the method comprising:

generating a candidate association rule defining an association relationship between itemsets in a distributed database system, which includes a plurality of partitions stored on respective storage devices associated with respective computing nodes that are interconnected by a communication network;

at each computing node and asynchronously with the other computing nodes, assessing a global correctness of the candidate association rule by communicating with only a subset of the computing nodes that neighbor the computing node; and performing an action with respect to the itemsets based on the assessed global correctness.

2. The method according to claim 1, wherein the computing nodes comprise peers in a peer-to-peer (P2P) system.

3. The method according to claim 1, wherein the computing nodes comprise sensors in a sensor network.

4. The method according to claim 1, wherein performing the action comprises performing at least one action type selected from a group of types consisting of:
identifying a user preference in a peer-to-peer (P2P) network;
detecting spam in an electronic mail (e-mail) system;
identifying a Distributed Denial of Service (DDoS) attack in a computer network;
monitoring events in the computer network;
determining a failure in the computer network;
balancing communication load in the computer network; and
allocating a resource in the computer network.

5. The method according to claim 1, wherein performing the action comprises modifying generation of subsequent candidate association rules.

6. The method according to claim 1, wherein assessing the global correctness comprises running one or more majority voting instances that estimate at least one of a global frequency and a global confidence of the candidate association rule.

7. The method according to claim 6, wherein comprises maintaining an ad-hoc solution comprising a list of association rules estimated to be correct, and iteratively updating the ad-hoc solution responsively to at least one of the estimated global frequency and the estimated global confidence.

8. The method according to claim 7, wherein the association relationship is represented as a first itemset implying a second itemset, both itemsets comprising items, and wherein generating the candidate association rule comprises:
identifying in the ad-hoc solution a pair of association rules having equal first itemsets and second itemsets that differ only in a single item; and
generating the candidate association rule such that the first itemset of the candidate associate rule is equal to the first itemsets of the pair of association rules and the second itemset of the candidate association rule is equal to the union of second itemsets of the pair of association rules.

9. The method according to claim 6, wherein assessing the global correctness comprises updating at least one of the estimated global frequency and the estimated global confidence responsively to an event comprising at least one of:
reception of a communication message from a neighbor node in the subset;
addition of a neighbor node in the subset;
removal of a neighbor node from the subset; and
a change in a local partition associated with the node assessing the global correctness.

10. The method according to claim 6, wherein communicating with the subset of the computing nodes comprises coordinating the estimated global frequency and confidence with the computing nodes in the subset.

11. The method according to claim 10, wherein communicating with the subset of the computing nodes comprises sending a communication message to a given neighbor node in the subset only when a disagreement occurs with the given neighbor node regarding at least one of the global frequency and the global confidence, thereby reducing a communication rate among the nodes.

12. The method according to claim 1, wherein assessing the global correctness comprises evaluating at least one of a local frequency and a local confidence of the candidate association rule in a local partition associated with the node assessing the global correctness.

13. A method for data mining, comprising:
defining a global condition relating to a distributed database system, which includes a plurality of partitions stored on respective storage devices associated with respective computing nodes that are interconnected by a communication network;
at each node and independently of the other nodes, evaluating a local condition responsively to data in a respective partition associated with the node and to messages received from a subset of the nodes that neighbor the node, wherein the local condition is defined such that fulfillment of the local condition at all the nodes is indicative of the fulfillment of the global condition;
when the local condition is not fulfilled at the node, exchanging at least one message with at least one node in the subset of the nodes; and
performing an action with respect to the distributed database responsively to the fulfillment of the global condition.

14. The method according to claim 13, wherein performing the action comprises performing at least one action type selected from a group of types consisting of:
identifying a user preference in a peer-to-peer (P2P) network;
detecting spam in an electronic mail (e-mail) system;
identifying a Distributed Denial of Service (DDoS) attack in a computer network;
monitoring events in the computer network;
determining a failure in the computer network;
balancing communication load in the computer network; and
allocating a resource in the computer network.

15. The method according to claim 13, wherein evaluating the local condition comprises exchanging the at least one message responsively to a disagreement among the nodes in the subset regarding the fulfillment of the local condition.

16. The method according to claim 13, wherein evaluating the local condition comprises exchanging the at least one message responsively to at least one of a change in at least one of the partitions, a failure of at least one of the nodes, and a recovery of at least one of the nodes.

17. The method according to claim 13, wherein defining the global condition comprises defining at least one of a frequency and a confidence of an association rule in the distributed database system, and wherein evaluating the local condition at each node comprises assessing at least one of the frequency and the confidence of the association rule in the partition associated with the node.

18. A system for mining association rules, comprising
a plurality of storage devices, adapted to hold respective partitions of a database; and
a corresponding plurality of computing nodes, each node associated with a respective one of the storage devices and coupled to communicate over a communication network with neighbor nodes among the plurality of the computing nodes,
wherein each node in at least a subset of the nodes is adapted:
to generate a candidate association rule defining an association relationship between itemsets in the database,
to assess a global correctness of the candidate association rule asynchronously with the other computing nodes by communicating with only the neighbor nodes, and
to perform an action with respect to the itemsets based on the assessed global correctness.

19. The system according to claim 18, wherein the computing nodes comprise peers in a peer-to-peer (P2P) system.

20. The system according to claim 18, wherein the computing nodes comprise sensors in a sensor network.

21. The system according to claim 18, wherein the action comprises at least one action type selected from a group of types consisting of:
  identification of a user preference in a peer-to-peer (P2P) network;
  detection of spam in an electronic mail (e-mail) system;
  identification of a Distributed Denial of Service (DDoS) attack in a computer network;
  monitoring of events in the computer network;
  determination of a failure in the computer network;
  balancing of a communication load in the computer network; and
  allocation of a resource in the computer network.

22. The system according to claim 18, wherein the action comprises modification of generation of subsequent candidate association rules.

23. The system according to claim 16, wherein each node in the at least subset of the nodes is arranged to run one or more majority voting instances that estimate at least one of a global frequency and a global confidence of the candidate association rule.

24. The system according to claim 23, wherein each node in the at least subset of the nodes is arranged to maintain an ad-hoc solution comprising a list of association rules estimated to be correct, and to iteratively update the ad-hoc solution responsively to at least one of the estimated global frequency and the estimated global confidence.

25. The system according to claim 24, wherein the association relationship is represented as a first itemset implying a second itemset, both itemsets comprising items, and wherein each node in the at least subset of the nodes is arranged to generate the candidate association rule by:
  identifying in the ad-hoc solution a pair of association rules having equal first itemsets and second itemsets that differ only in a single item; and
  generating the candidate association rule such that the first itemset of the candidate association rule is equal to the first itemsets of the pair of association rules and the second itemset of the candidate association rule is equal to the union of second itemsets of the pair of association rules.

26. The system according to claim 23, wherein each node in the at least subset of the nodes is arranged to update at least one of the estimated global frequency and the estimated global confidence responsively to an event comprising at least one of reception of a communication message from one of the neighbor nodes, addition of a neighbor node, removal of a neighbor node and a change in a local partition associated with the node.

27. The system according to claim 23, wherein each node in the at least subset of the nodes is arranged to exchange a communication message with one of the neighbor nodes so as to coordinate the estimated global frequency and confidence.

28. The system according to claim 27, wherein each node in the at least subset of the nodes is arranged to send the communication message to the one of the neighbor nodes only when a disagreement occurs between the node and the one of the neighbor nodes regarding at least one of the global frequency and the global confidence, thereby reducing a communication rate among the nodes.

29. The system according to claim 18, wherein each node in the at least subset of the nodes is arranged to evaluate at least one of a local frequency and a local confidence of the candidate association rule in a local partition associated with the node.

30. A computer software product for mining association rules using computing nodes that are associated with respective storage devices holding respective partitions of a database and are coupled to communicate over a communication network with neighbor nodes among the plurality of computing nodes, the product comprising;
  a computer-readable medium, in which program instructions are stored, which instructions, when read by the computing nodes, cause each node in at least a subset of the computing nodes:
    to generate a candidate association rule defining an association relationship between itemsets in the database,
    to assess a global correctness of the candidate association rule asynchronously with the other computing nodes by communicating with only the neighbor nodes, and
    to perform an action with respect to the itemsets based on the assessed global correctness.

31. The product according to claim 30, wherein the instructions cause each node to run one or more majority voting instances that estimate at least one of a global frequency and a global confidence of the candidate association rule.

32. The product according to claim 31, wherein the instructions cause each node to maintain an ad-hoc solution comprising a list of association rules estimated to be correct, and to iteratively update the ad-hoc solution responsively to at least one of the estimated global frequency and the estimated global confidence.

33. The product according to claim 31, wherein the instructions cause each node to update at least one of the estimated global frequency and the estimated global confidence responsively to an event comprising at least one of reception of a communication message from one of the neighbor nodes, addition of a neighbor node, removal of a neighbor node and a change in a local partition associated with the node.

34. The product according to claim 31, wherein the instructions cause each node to exchange a communication message with one of the neighbor nodes so as to coordinate the estimated global frequency and confidence.

35. The product according to claim 34, wherein the instructions cause each node to send the communication message to the one of the neighbor nodes only when a disagreement occurs between the node and the one of the neighbor nodes regarding at least one of the global frequency and the global confidence, thereby reducing a communication rate among the nodes.

36. A computer software product for mining data using computing nodes that are associated with respective storage devices holding respective partitions of a database and are coupled to communicate over a communication network with neighbor nodes among the plurality of computing nodes, the product comprising:
  a computer-readable medium, in which program instructions are stored, which instructions, when read by the computing nodes, cause each node:
    to accept a definition of a global condition relating to at least part of the distributed database,
    to evaluate, independently of the other nodes, a local condition responsively to data in a respective partition associated with the node and to messages received from the neighbor nodes,
  wherein the local condition is defined such that fulfillment of the local condition at all the nodes is indicative of the fulfillment of the global condition, to exchange at least one message with at least one of the neighbor nodes when the local condition is not fulfilled at the node, and to perform an action with respect to the distributed database responsively to the fulfillment of the global condition.

37. The product according to claim 36, wherein the instructions cause each node to exchange the at least one message responsively to a disagreement among the neighbor nodes regarding the fulfillment of the local condition.

38. The product according to claim 36, wherein the instructions cause the nodes to exchange the at least one message responsively to at least one of a change in at least one of the partitions, a failure of at least one of the neighbor nodes, and a recovery of at least one of the neighbor nodes.

39. The product according to claim 36, wherein the global condition comprises at least one of a frequency and a confidence of an association rule in the database, and wherein, for each node, the local condition comprises at least one of the frequency and the confidence of the association rule in the partition associated with the node.

* * * * *